United States Patent
Shi et al.

(10) Patent No.: US 9,967,731 B2
(45) Date of Patent: May 8, 2018

(54) MOBILE PHONE WITH SPLIT CS AND PS SERVICES ON DUAL SIMS FOR IMPROVED DATA ROAMING

(71) Applicant: Apple Inc., Cupertino, CA (US)

(72) Inventors: Jianxiong Shi, Dublin, CA (US); Li Su, San Jose, CA (US); Johnson O. Sebeni, Fremont, CA (US)

(73) Assignee: Apple Inc., Cupertino, CA (US)

( * ) Notice: Subject to any disclaimer, the term of this patent is extended or adjusted under 35 U.S.C. 154(b) by 12 days.

(21) Appl. No.: 14/799,137

(22) Filed: Jul. 14, 2015

(65) Prior Publication Data
US 2016/0029199 A1    Jan. 28, 2016

Related U.S. Application Data (60) Provisional application No. 62/029,372, filed on Jul. 25, 2014.

(51) Int. Cl.
*H04W 4/00* (2018.01)
*H04W 8/02* (2009.01)
(Continued)

(52) U.S. Cl.
CPC ............ *H04W 8/02* (2013.01); *H04B 1/3816* (2013.01); *H04M 15/49* (2013.01); *H04M 15/80* (2013.01);
(Continued)

(58) Field of Classification Search
CPC ....... H04W 8/183; H04W 12/06; H04W 4/14; H04W 8/245; H04W 28/04; H04W 80/04;
(Continued)

(56) References Cited

U.S. PATENT DOCUMENTS 8,737,318 B2   5/2014  Fan et al.
8,909,290 B2   12/2014 Ruvalcaba et al.
(Continued)

FOREIGN PATENT DOCUMENTS

CN    102984686 A    3/2013
EP    2757835 A1    7/2014

OTHER PUBLICATIONS

International Search Report & Written Opinion, Application No. PCT/US2015/040514, dated Oct. 21, 2015, 15 pages.
(Continued)

*Primary Examiner* — Charles Appiah
*Assistant Examiner* — Alexander Yi
(74) *Attorney, Agent, or Firm* — Meyertons Hood Kivlin Kowert & Goetzel, P.C.; Jeffrey C. Hood (57) ABSTRACT

Embodiments relate to a User Equipment (UE) device and associated method performing improved data roaming with reduced cost. The UE may comprise at least one radio, one or more processors, a first SIM entity and a second SIM entity. The first SIM entity may be configured to implement subscriber identity module (SIM) functionality for a subscribed voice and/or data plan of a first carrier. The second SIM entity may be configured to facilitate dynamic subscription to a local data plan of a second carrier when the UE is data roaming outside of a network of the first carrier. As one example, the UE, using the second SIM entity, may be configured to dynamically subscribe to a pay-as-you-go data plan of a second carrier, to which the user is not subscribed, when the user is data roaming outside of the first carrier's network. This dynamic subscribing may operate to reduce cost to the user, since the local data plan of the second carrier likely has less expensive data rates than those available during normal data roaming.

19 Claims, 7 Drawing Sheets

(51) Int. Cl.

| | | |
|---|---|---|
| *H04M 15/00* | (2006.01) | |
| *H04W 8/06* | (2009.01) | |
| *H04B 1/3816* | (2015.01) | |
| *H04W 48/16* | (2009.01) | |
| *H04W 48/18* | (2009.01) | |
| *H04W 4/24* | (2018.01) | |

(52) U.S. Cl.
CPC ... *H04M 15/8038* (2013.01); *H04M 15/8083* (2013.01); *H04M 15/8214* (2013.01); *H04W 4/24* (2013.01); *H04W 8/06* (2013.01); *H04W 48/16* (2013.01); *H04W 48/18* (2013.01)

(58) Field of Classification Search
CPC ......... H04W 8/02; H04W 8/06; H04W 48/16; H04W 48/18; H04W 76/02; H04W 88/06; H04W 24/02; H04B 1/3816; H04L 41/12
USPC ..... 455/432.1, 558, 411, 466, 418; 370/329, 370/254, 328
See application file for complete search history.

(56) References Cited

U.S. PATENT DOCUMENTS

| | | | | |
|---|---|---|---|---|
| 2007/0224969 | A1* | 9/2007 | Rao | H04W 12/06 455/411 |
| 2010/0056102 | A1* | 3/2010 | Chan | H04L 12/14 455/406 |
| 2011/0070922 | A1* | 3/2011 | Kim | H04M 1/72519 455/558 |
| 2012/0115417 | A1* | 5/2012 | Moring | H04W 48/20 455/41.2 |
| 2012/0129513 | A1* | 5/2012 | van der Laak | H04W 4/001 455/419 |
| 2012/0289193 | A1* | 11/2012 | Bergenwall | H04W 12/12 455/410 |
| 2013/0150013 | A1 | 6/2013 | Liu et al. | |
| 2013/0150032 | A1 | 6/2013 | Pattaswamy et al. | |
| 2013/0165075 | A1* | 6/2013 | Rishy-Maharaj | H04W 12/04 455/411 |
| 2013/0237197 | A1 | 9/2013 | Ruvalcaba et al. | |
| 2013/0316672 | A1* | 11/2013 | Nousiainen | H04W 4/001 455/406 |
| 2013/0329639 | A1* | 12/2013 | Wietfeldt | H04W 88/06 370/328 |
| 2014/0140287 | A1* | 5/2014 | Cheng | H04W 76/02 370/329 |
| 2014/0169216 | A1 | 6/2014 | Mansson et al. | |
| 2014/0200048 | A1 | 7/2014 | Cheng | |
| 2015/0065106 | A1* | 3/2015 | Catovic | H04W 8/22 455/418 |

OTHER PUBLICATIONS

Office Action for ROC (Taiwan) Patent Application No. 104123928, dated Jun. 27, 2016, pp. 1-25.

* cited by examiner

MOBILE PHONE WITH SPLIT CS AND PS SERVICES ON DUAL SIMS FOR IMPROVED DATA ROAMING

PRIORITY DATA

This application claims the benefit of U.S. Provisional Application No. 62/029,372, filed Jul. 25, 2014, which is incorporated by reference herein in its entirety.

FIELD OF THE INVENTION

The present application relates to wireless cellular devices, and more particularly to a system and method for providing improved cellular data roaming with reduced cost.

DESCRIPTION OF THE RELATED ART

Wireless communication systems are rapidly growing in usage. Further, wireless communication technology has evolved from voice-only communications to also include the transmission of data, such as Internet and multimedia content. Therefore, improvements are desired in wireless communication.

In cellular communication systems, users often subscribe to a cellular carrier for voice and data services. However, when the user is in a different location that is not adequately supported by his chosen cellular carrier, the user will often need to roam on another network. Data roaming on other carrier networks is often very expensive. Thus improvements in the field are desired.

SUMMARY OF THE INVENTION

Embodiments described herein relate to a User Equipment (UE) device and associated method performing improved data roaming with reduced cost. The UE may comprise at least one radio, one or more processors, a first SIM entity, and a second SIM entity. The term "SIM entity" refers to any of various types of SIM devices or functionality, such as a SIM card, eSIM, etc. The at least one radio is configured to perform voice and/or data communications using one or more radio access technology (RAT).

The first SIM entity may be configured to implement subscriber identity module (SIM) functionality for a subscribed voice and/or data plan of a first carrier. In other words, the first SIM entity may be configured according to a first carrier to which the user has subscribed. For example, the first SIM entity may specify a voice telephone number for the UE that operates with the first carrier.

The second SIM entity may be configured to facilitate dynamic subscription to a local data plan of a second carrier when the UE is data roaming outside of a network of the first carrier. As one example, the second SIM entity may be configured to enable dynamic subscription to a pay-as-you-go data plan of a second carrier, to which the user is not subscribed, when the user is data roaming outside of the first carrier's network. This dynamic subscribing may operate to reduce cost to the user because the local data plan of the second carrier likely has less expensive data rates than those available during normal data roaming. The second SIM entity may be configured to enable dynamic subscription to a local data plan of any one of a plurality of possible second carriers. While the second SIM entity is dynamically subscribed to the local data plan of the second carrier, the voice telephone number for the UE specified by the first SIM entity may remain operational via use of the first SIM entity.

The UE may further comprise a memory that stores a first protocol stack and a second protocol stack. Thus the UE may store and execute two independent protocol stacks. The first protocol stack may support communication using at least one first RAT of a first carrier using the first SIM entity, and the second protocol stack may support communication using at least one second RAT of a second carrier using the second SIM entity. The processor may be configured to execute either the first protocol stack or the second protocol stack to control the at least one radio.

In one embodiment, the UE is configured to automatically select either the first SIM entity or second SIM entity based on various criteria such as, for example, service availability of a first network using the first SIM entity versus service availability of a second network using the second SIM entity. When the UE is operating on the second network using the second SIM entity to avoid costly data roaming charges, if the second network suffers degradation, the UE may selectively revert back to normal (more costly) data roaming using the first SIM entity and the first network. The UE may later return to using the second network and the second SIM entity when the second network improves. In deciding whether to use the first SIM entity or the second SIM entity, the UE may use criteria such as radio link quality metrics, cost (roaming versus non-roaming), and/or type of RAT, among others.

In another embodiment, the UE may be configured to receive user input selecting a preference for data communication using either the first SIM entity or the second SIM entity. In other words, the user can choose a preference of receiving data using either the first SIM entity (physical SIM) or the second SIM entity (eSIM). This user input may be provided via a touch screen of the UE, or other user input mechanism. Thus the UE may be configured to transmit data using either the first or second SIM entity, wherein this configuration may be specified manually by the user or automatically by an intelligent algorithm based on one or more criteria, or some combination thereof.

In one embodiment, circuit-switched and packet-switched services may be split between the two SIM entities. For example, the UE may be configured to perform circuit-switched voice communication on the first SIM entity, and the UE may be configured to perform packet-switched communication on the second SIM entity.

This Summary is provided for purposes of summarizing some exemplary embodiments to provide a basic understanding of aspects of the subject matter described herein. Accordingly, the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present invention can be obtained when the following detailed description of the embodiments is considered in conjunction with the following drawings.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Acronyms

The following acronyms are used in the present disclosure.

3GPP: Third Generation Partnership Project
3GPP2: Third Generation Partnership Project 2
GSM: Global System for Mobile Communications
UMTS: Universal Mobile Telecommunications System
LTE: Long Term Evolution
RAT: Radio Access Technology
TX: Transmit
RX: Receive
SIM: Subscriber Identity Module Terms The following is a glossary of terms used in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a nonvolatile memory such as a Flash, magnetic media, e.g., a hard drive, or optical storage; registers, or other similar types of memory elements, etc. The memory medium may include other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), personal communication device, smart phone, television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, PDAs, portable Internet devices, music players, data storage devices, other handheld devices, as well as wearable devices such as wrist-watches, headphones, pendants, earpieces, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 1:
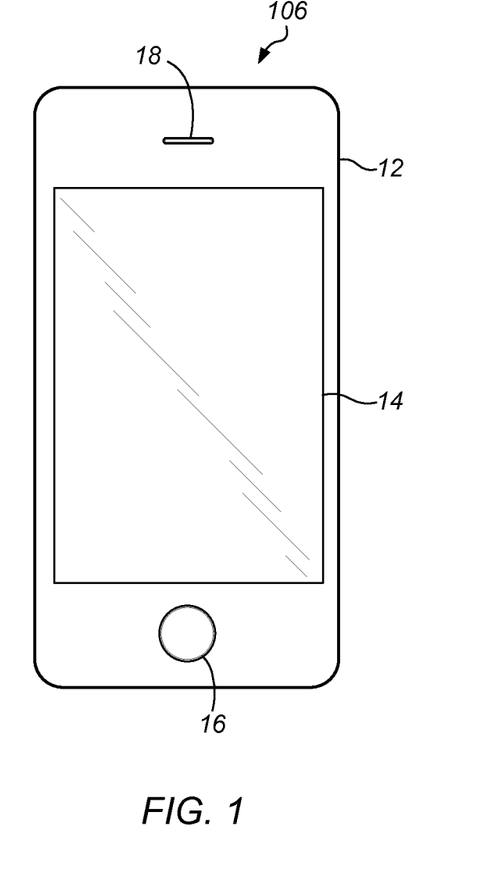
FIG. 1 illustrates an example user equipment (UE) according to some embodiments.

FIG. 1—User Equipment

FIG. 1 illustrates an example user equipment (UE) 106 according to some embodiments. The term UE 106 may be any of various devices as defined above. UE device 106 may include a housing 12 which may be constructed from any of various materials. UE 106 may have a display 14, which may be a touch screen that incorporates capacitive touch electrodes. Display 14 may be based on any of various display technologies. The housing 12 of the UE 106 may contain or comprise openings for any of various elements, such as home button 16, speaker port 18, and other elements (not shown), such as microphone, data port, and possibly various other types of buttons, e.g., volume buttons, ringer button, etc.

The UE 106 may support multiple radio access technologies (RATs). For example, UE 106 may be configured to communicate using any of various RATs such as two or more of Global System for Mobile Communications (GSM), Universal Mobile Telecommunications System (UMTS), Code Division Multiple Access (CDMA) (e.g., CDMA2000 1×RTT or other CDMA radio access technologies), Long Term Evolution (LTE), Advanced LTE, and/or other RATs. For example, the UE 106 may support at least two radio access technologies such as LTE and GSM. Various different or other RATs may be supported as desired.

The UE 106 may comprise one or more antennas. The UE 106 may also comprise any of various radio configurations, such as various combinations of one or more transmitter chains (TX chains) and one or more receiver chains (RX chains). For example, the UE 106 may comprise a radio that supports two or more RATs. The radio may comprise a single TX (transmit) chain and a single RX (receive) chain. Alternatively, the radio may comprise a single TX chain and two RX chains that operate on the same frequency. In another embodiment, the UE 106 comprises two or more radios, i.e., two or more TX/RX chains (two or more TX chains and two or more RX chains).

In the embodiment described herein, the UE 106 comprises two antennas which communicate using two or more RATs. For example, the UE 106 may have a pair of cellular telephone antennas coupled to a single radio or shared radio. The antennas may be coupled to the shared radio (shared wireless communication circuitry) using switching circuits and other radio-frequency front-end circuitry. For example, the UE 106 may have a first antenna that is coupled to a transceiver or radio, i.e., a first antenna that is coupled to a transmitter chain (TX chain) for transmission and which is coupled to a first receiver chain (RX chain) for receiving. The UE 106 may also comprise a second antenna that is coupled to a second RX chain.

Figure 2:
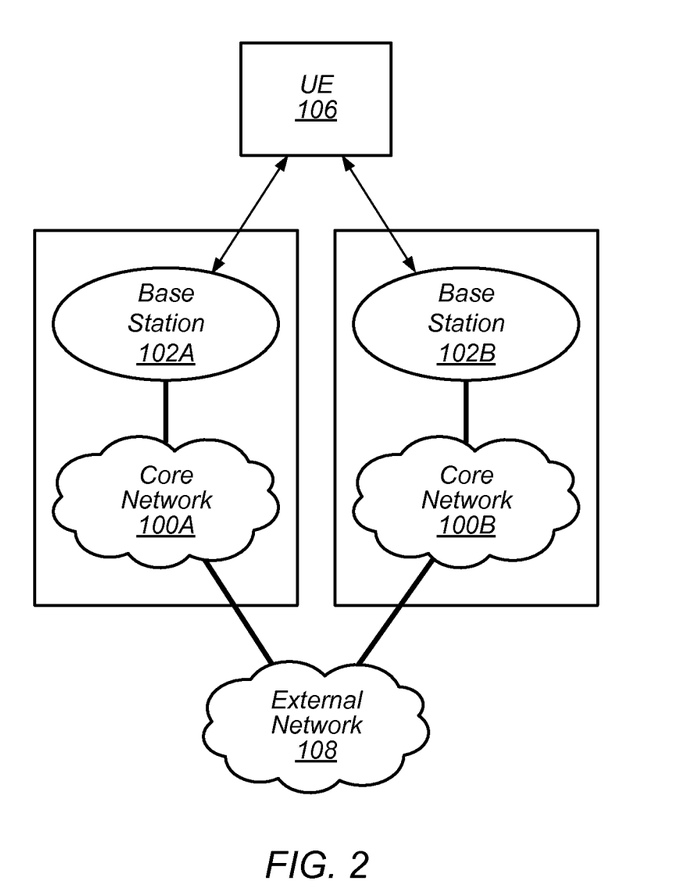
FIG. 2 illustrates an example wireless communication system in which a UE communicates with two base stations using two different RATs, according to some embodiments.

FIG. 2—Communication System

FIG. 2 illustrates an exemplary (and simplified) wireless communication system according to some embodiments. It is noted that the system of FIG. 2 is merely one example of a possible system, and embodiments may be implemented in any of various systems, as desired.

As shown, the exemplary wireless communication system includes base stations 102A and 102B, which communicate over a transmission medium with one or more user equipment (UE) devices, represented as UE 106. The base stations 102 may be base transceiver stations (BTS) or cell sites, and may include hardware that enables wireless communication with the UE 106. Each base station 102 may also be equipped to communicate with a core network 100. For example, base station 102A may be coupled to core network 100A, while base station 102B may be coupled to core network 100B. Each core network may be operated by a respective cellular service provider, or the plurality of core networks 100A may be operated by the same cellular service provider. Each core network 100 may also be coupled to one or more external networks (such as external network 108), which may include the Internet, a Public Switched Telephone Network (PSTN), and/or any other network. Thus, the base stations 102 may facilitate communication between the UE devices 106 and/or between the UE devices 106 and the networks 100A, 100B, and 108.

The base stations 102 and the UEs 106 may be configured to communicate over the transmission medium using any of various radio access technologies ("RATs," also referred to as wireless communication technologies or telecommunication standards), such as GSM, UMTS (including UMTS frequency division duplex (UMTS-FDD) and UMTS time division duplex (UMTS-TDD)), LTE, LTE Advanced (LTE-A), 3GPP2 CDMA2000 (e.g., 1×RTT, 1×EV-DO, HRPD, eHRPD), IEEE 802.11 (WLAN or Wi-Fi), IEEE 802.16 (WiMAX), etc.

Base station 102A and core network 100A may operate according to a first RAT (e.g., LTE) while base station 102B and core network 100B may operate according to a second (e.g., different) RAT (e.g., GSM, CDMA 2000 or other legacy or circuit switched technologies). The two networks may be controlled by the same network operator (e.g., cellular service provider or "carrier"), or by different network operators, as desired. In addition, the two networks may be operated independently of one another (e.g., if they operate according to different RATs), or may be operated in a somewhat coupled or tightly coupled manner.

Note also that while two different networks may be used to support two different RATs, such as illustrated in the exemplary network configuration shown in FIG. 2, other network configurations implementing multiple RATs are also possible. As one example, base stations 102A and 102B might operate according to different RATs but couple to the same core network. As another example, multi-mode base stations capable of simultaneously supporting different RATs (e.g., LTE and GSM, LTE and CDMA2000 1×RTT, and/or any other combination of RATs) might be coupled to a core network that also supports the different cellular communication technologies. In one embodiment, the UE 106 may be configured to use a first RAT that is a packet-switched technology (e.g., LTE) and a second RAT that is a circuit-switched technology (e.g., GSM or 1×RTT).

As discussed above, UE 106 may be capable of communicating using multiple RATs, such as those within 3GPP, 3GPP2, or any desired cellular standards. The UE 106 might also be configured to communicate using WLAN, Bluetooth, one or more global navigational satellite systems (GNSS, e.g., GPS or GLONASS), one and/or more mobile television broadcasting standards (e.g., ATSC-M/H or DVB-H), etc. Other combinations of network communication standards are also possible.

Base stations 102A and 102B and other base stations operating according to the same or different RATs or cellular communication standards may thus be provided as a network of cells, which may provide continuous or nearly continuous overlapping service to UE 106 and similar devices over a wide geographic area via one or more radio access technologies (RATs).

Figure 3:
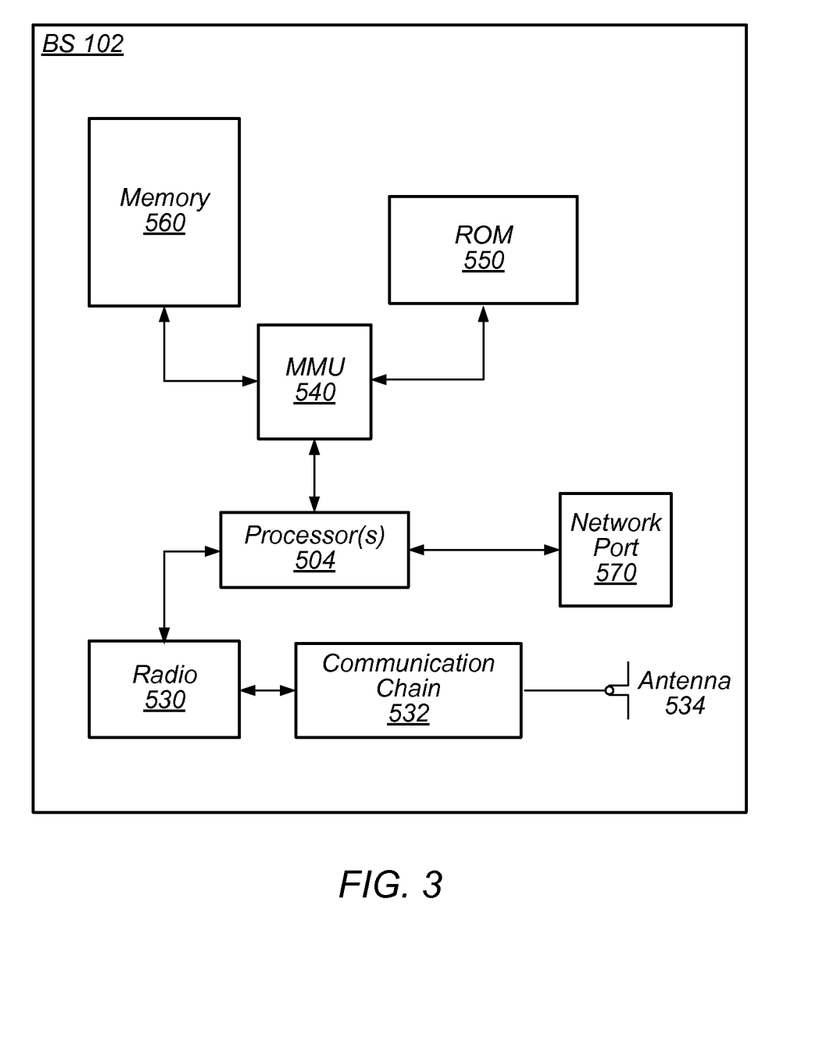
FIG. 3 is an example block diagram of a base station, according to some embodiments.

FIG. 3—Base Station

FIG. 3 illustrates an exemplary block diagram of a base station 102 according to some embodiments. It is noted that the base station of FIG. 3 is merely one example of a possible base station. As shown, the base station 102 may include processor(s) 504 which may execute program instructions for the base station 102. The processor(s) 504 may also be coupled to memory management unit (MMU) 540, which may be configured to receive addresses from the processor(s) 504 and translate those addresses to locations in memory (e.g., memory 560 and read only memory (ROM) 550) or to other circuits or devices.

The base station 102 may include at least one network port 570. The network port 570 may be configured to couple to a telephone network and provide a plurality of devices, such as UE devices 106, access to the telephone network as described above.

The network port 570 (or an additional network port) may also or alternatively be configured to couple to a cellular network, e.g., a core network of a cellular service provider. The core network may provide mobility related services and/or other services to a plurality of devices, such as UE devices 106. In some cases, the network port 570 may couple to a telephone network via the core network, and/or the core network may provide a telephone network (e.g., among other UE devices 106 serviced by the cellular service provider).

The base station 102 may include at least one antenna 534. The at least one antenna 534 may be configured to operate as a wireless transceiver and may be further configured to communicate with UE devices 106 via radio 530. The antenna 534 communicates with the radio 530 via communication chain 532. Communication chain 532 may be a receive chain, a transmit chain or both. The radio 530 may be configured to communicate via various RATs, including, but not limited to, LTE, GSM, WCDMA, CDMA2000, etc.

The processor(s) 504 of the base station 102 may be configured to implement part or all of the methods described herein, e.g., by executing program instructions stored on a memory medium (e.g., a non-transitory computer-readable memory medium). Alternatively, the processor 504 may be configured as a programmable hardware element, such as an FPGA (Field Programmable Gate Array), or as an ASIC (Application Specific Integrated Circuit), or a combination thereof.

Figure 4:
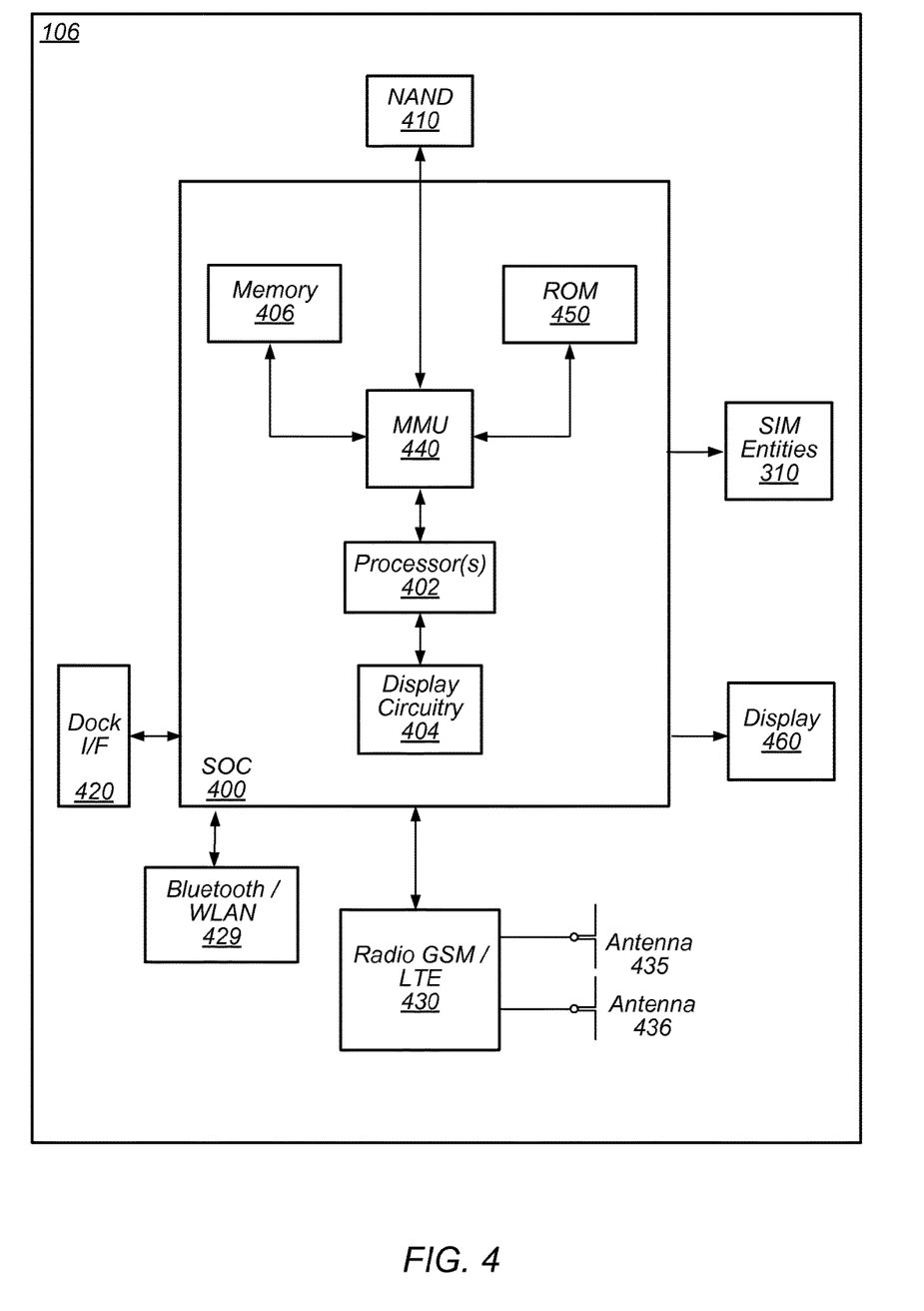
FIG. 4 is an example block diagram of a UE, according to some embodiments.

FIG. 4—User Equipment (UE)

FIG. 4 illustrates an example simplified block diagram of a UE 106 according to some embodiments. As shown, the UE 106 may include a system on chip (SOC) 400, which may include portions for various purposes. The SOC 400 may be coupled to various other circuits of the UE 106. For example, the UE 106 may include various types of memory (e.g., including NAND flash 410), a connector interface 420 (e.g., for coupling to a computer system, dock, charging station, etc.), the display 460, cellular communication circuitry 430 such as for LTE, GSM, etc., and short range wireless communication circuitry 429 (e.g., Buletooth and WLAN circuitry). The cellular communication circuitry 430 may couple to one or more antennas, preferably two antennas 435 and 436 as shown. The short range wireless communication circuitry 429 may also couple to one or both of the antennas 435 and 436 (this connectivity is not shown for ease of illustration).

As shown, the SOC 400 may include processor(s) 402 which may execute program instructions for the UE 106 and display circuitry 404 which may perform graphics processing and provide display signals to the display 460. The processor(s) 402 may also be coupled to memory management unit (MMU) 440, which may be configured to receive addresses from the processor(s) 402 and translate those addresses to locations in memory (e.g., memory 406, read only memory (ROM) 450, NAND flash memory 410) and/or to other circuits or devices, such as the display circuitry 404, cellular communication circuitry 430, short range wireless communication circuitry 429, connector I/F 420, and/or display 460. The MMU 440 may be configured to perform memory protection and page table translation or set up. In some embodiments, the MMU 440 may be included as a portion of the processor(s) 402.

The UE 106 may further comprise two or more SIM (Subscriber Identity Module) entities 310, where the term "SIM entity" encompasses any of various types of devices or memories which implement SIM functionality. For example, a SIM entity may be a smart card, a UICC(s) (Universal Integrated Circuit Card(s)) card, an eUICC, and/or an eSIM, among other possible implementations. Each SIM entity executes a Subscriber Identity Module (SIM) application and/or otherwise implements SIM functionality.

The inclusion of two or more SIM entities 310 in the UE 106 may allow the UE 106 to communicate on corresponding two or more respective networks and/or may allow the UE 106 to support two different telephone numbers. For example, a first SIM entity 310 may comprise SIM functionality to support a first RAT, and a second SIM entity 310 may comprise SIM functionality to support a second RAT. Where the UE 106 comprises two SIM entities 310, the UE 106 may support Dual SIM Dual Active (DSDA) functionality. The DSDA functionality may allow the UE 106 to be simultaneously connected to two networks (and use two different RATs) at the same time. The DSDA functionality may also allow the UE 106 may to simultaneously receive voice calls or data traffic on either phone number. In another embodiment, the UE 106 supports Dual SIM Dual Standby (DSDS) functionality. The DSDS functionality may allow either of the two SIM entities 310 in the UE 106 to be on standby waiting for a voice call and/or data connection. In DSDS, when a call/data is established on one SIM entity 310, the other SIM entity 310 may no longer be active. In one embodiment, the functionality described herein, including DSDx functionality (either DSDA or DSDS functionality) may be implemented with a single SIM entity (e.g., a eUICC) that executes multiple SIM applications for different carriers and/or RATs.

Where the SIM entity 310 is a smart card, the smart card may be embedded, e.g., may be soldered onto a circuit board in the UE 106, or the smart card may be implemented as a removable smart card. At least one of the SIM entities 310 may be a removable smart card (such as a UICC card, which is sometimes referred to as a "SIM card"), and/or at least one of the SIM entities may be an embedded memory or card (such as an embedded UICC (eUICC), which is sometimes referred to as an "eSIM" or "eSIM card"). Where the SIM entity 310 is implemented as a smart card, the smart card may include components such as a processor and a memory, and instructions for performing SIM/eSIM functionality may be stored in the memory and executed by the processor. Where the SIM entity 310 is implemented as an eSIM, the eSIM may be implemented as a fixed (or removable) memory that implements SIM functionality. In one embodiment, the UE 106 may comprise a combination of removable smart cards and fixed/non-removable eSIMs (such as one or more eUICC cards or memories that implement eSIM functionality), as desired. For example, the UE 106 may comprise a removable SIM card or SIM smart card 310 and an eSIM 310. Various other SIM configurations are also contemplated. In some embodiments (such as when the SIM entity 310 comprises an eSIM or eUICC), one of the SIM entities 310 may execute multiple SIM applications.

In one embodiment, the at least two SIM entities 310 may comprise a first SIM entity 310 that operates in conjunction with the UE's home (first) network for voice/data communications, and a second SIM entity 310 that is used at least in part for registering as a local entity on foreign networks. Operation of these two SIM entities is discussed in greater detail below.

As noted above, the UE 106 may be configured to communicate wirelessly using multiple radio access technologies (RATs). As further noted above, in such instances, the cellular communication circuitry (radio(s)) 430 may include radio components which are shared between multiple RATS and/or radio components which are configured exclusively for use according to a single RAT. Where the UE 106 comprises at least two antennas, the antennas 435 and 436 may be configurable for implementing MIMO (multiple input multiple output) communication.

As described herein, the UE 106 may include hardware and software components for implementing features for improved data roaming, such as those described herein. The processor 402 of the UE device 106 may be configured to implement part or all of the features described herein, e.g., by executing program instructions stored on a memory medium (e.g., a non-transitory computer-readable memory medium). Alternatively (or in addition), processor 402 may be configured as a programmable hardware element, such as an FPGA (Field Programmable Gate Array), or as an ASIC (Application Specific Integrated Circuit). Alternatively (or in addition) the processor 402 of the UE device 106, in conjunction with one or more of the other components 400, 404, 406, 410, 420, 430, 435, 440, 450, 460 may be configured to implement part or all of the features described herein.

Figure 5A:
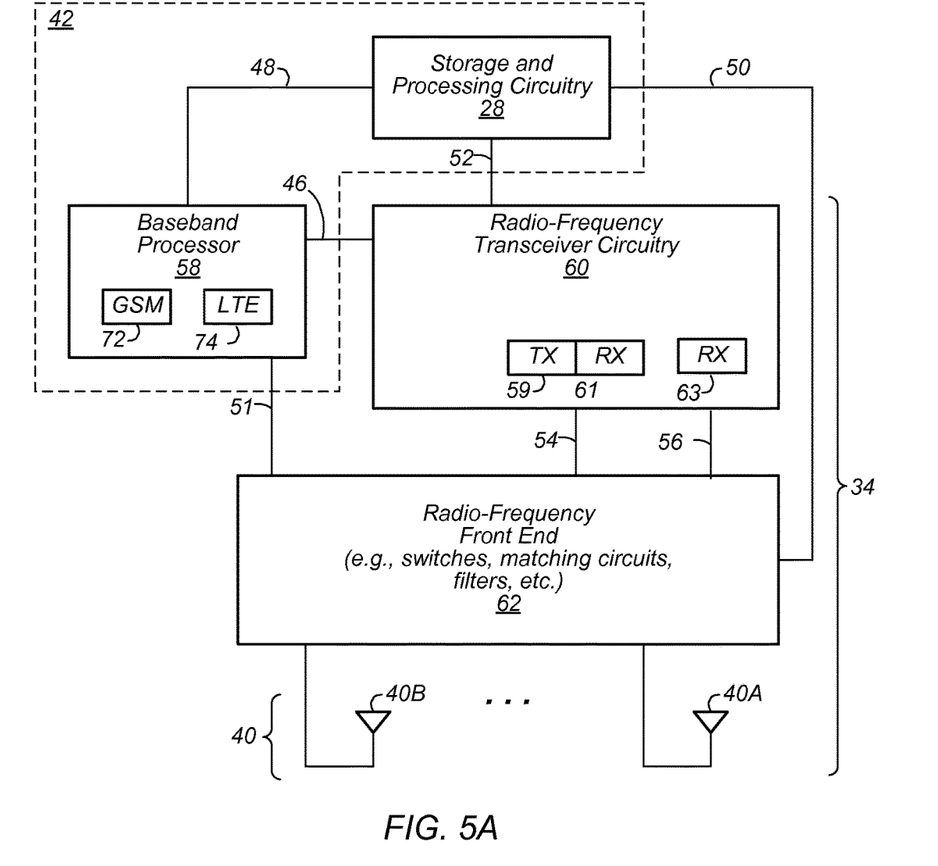
FIGS. 5A and 5B are example block diagrams of wireless communication circuitry in the UE, according to some embodiments.
Figure 5B:
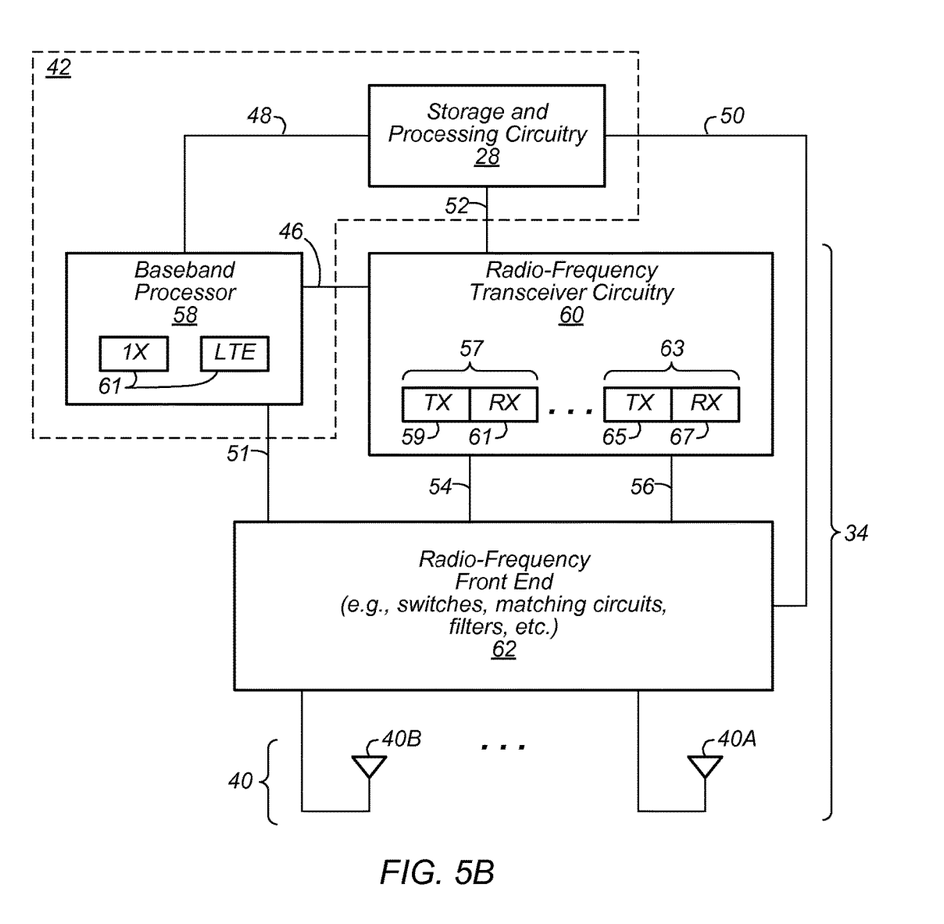

FIGS. 5A and 5B—UE Transmit/Receive Logic

FIG. 5A illustrates a portion of UE 106 according to some embodiments. As shown, UE 106 may comprise control circuitry 42 that is configured to store and execute control code for implementing control algorithms in the UE 106. Control circuitry 42 may include storage and processing circuitry 28 (e.g., a microprocessor, memory circuits, etc.) and may include baseband processor integrated circuit 58. Baseband processor 58 may form part of wireless circuitry 34 and may include memory and processing circuits (i.e., baseband processor 58 may be considered to form part of the storage and processing circuitry of UE 106). Baseband processor 58 may comprise software and/or logic for handling various different RATs, such as GSM logic 72 and LTE logic 74, among others.

Baseband processor 58 may provide data to storage and processing circuitry 28 (e.g., a microprocessor, nonvolatile memory, volatile memory, other control circuits, etc.) via path 48. The data on path 48 may include raw and processed data associated with UE cellular communications and operations, such as cellular communication data, wireless (antenna) performance metrics for received signals, information related to tune-away operations, information related to paging operations, etc. This information may be analyzed by storage and processing circuitry 28 and/or processor 58 and, in response, storage and processing circuitry 28 (or, if desired, baseband processor 58) may issue control commands for controlling wireless circuitry 34. For example, storage and processing circuitry 28 may issue control commands on path 52 and path 50 and/or baseband processor 58 may issue commands on path 46 and path 51.

Wireless circuitry 34 may include radio-frequency transceiver circuitry such as radio-frequency transceiver circuitry 60 and radio-frequency front-end circuitry 62. Radio-frequency transceiver circuitry 60 may include one or more radio-frequency transceivers. In the embodiment shown radio-frequency transceiver circuitry 60 comprises transceiver (TX) chain 59, receiver (RX) chain 61 and RX chain 63. As noted above, the two RX chains 61 and 63 may be a primary RX chain 61 and a diversity RX chain 63. The two RX chains 61 and 63 may be connected to the same local oscillator (LO) and thus may operate together at the same frequency for MIMO operations. Thus the TX chain 59 and the two RX chains 61 and 63 may be considered, along with other necessary circuitry, as a single radio. Other embodiments are of course contemplated. For example, the radio-frequency transceiver circuitry 60 may comprise only a single TX chain and only a single RX chain, also a single radio embodiment. Thus the term "radio" may be defined to have the broadest scope of its ordinary and accepted meaning, and comprises the circuitry normally found in a radio, including but not limited to either a single TX chain and a single RX chain or a single TX chain and two (or more) RX chains, e.g., connected to the same LO. The term radio may encompass the transmit and receive chains discussed above and may also include digital signal processing coupled to the radio frequency circuitry (e.g., the transmit and receive chains) associated with performing wireless communication. As one example, the transmit chain may include such components as amplifier, mixer, filter, and digital analog converter. Similarly, the receive chain(s) may include, e.g., such components as amplifier, mixer, filter, and analog to digital converter. As mentioned above, multiple receive chains may share a LO, although in other embodiments, they may comprise their own LO. Wireless communication circuitry may encompass a larger set of components, e.g., including one or more radios of the UE (transmit/receive chains and/or digital signal processing), baseband processors, etc. The term "cellular wireless communication circuitry" includes various circuitry for performing cellular communication, e.g., as opposed to other protocols that are not cellular in nature, such as Bluetooth. Certain embodiments of the invention described herein may operate to improve performance when a single radio (i.e., a radio with a single TX chain and single RX chain; or a radio with a single TX chain and two RX chains, where the two RX chains are connected to the same LO) supports multiple RATs.

As shown in FIG. 5B, the radio-frequency transceiver circuitry 60 may also comprise two or more TX chains and two or more RX chains. For example, FIG. 5B shows an embodiment with a first radio 57 comprising TX chain 59 and RX chain 61 and a second radio 63 comprising a first TX chain 65 and a second TX chain 67. Embodiments are also contemplated where additional TX/RX receive chains may be included in the embodiment of FIG. 5A, i.e., in addition to the one TX chain 59 and two RX chains 61 and 63 shown. In these embodiments that have multiple TX and RX chains, when only one radio is currently active, e.g., the second radio is turned off to save power, certain embodiments of the invention described herein may operate to improve performance of the single active radio when it supports multiple RATs.

Baseband processor 58 may receive digital data that is to be transmitted from storage and processing circuitry 28 and may use path 46 and radio-frequency transceiver circuitry 60 to transmit corresponding radio-frequency signals. Radio-frequency front end 62 may be coupled between radio-frequency transceiver 60 and antennas 40 and may be used to convey the radio-frequency signals that are produced by radio-frequency transceiver circuitry 60 to antennas 40. Radio-frequency front end 62 may include radio-frequency switches, impedance matching circuits, filters, and other circuitry for forming an interface between antennas 40 and radio-frequency transceiver 60.

Incoming radio-frequency signals that are received by antennas 40 may be provided to baseband processor 58 via radio-frequency front end 62, paths such as paths 54 and 56, receiver circuitry in radio-frequency transceiver 60, and paths such as path 46. Path 54 may, for example, be used in handling signals associated with transceiver 57, whereas path 56 may be used in handling signals associated with transceiver 63. Baseband processor 58 may convert received signals into digital data that is provided to storage and processing circuitry 28. Baseband processor 58 may also extract information from received signals that is indicative of signal quality for the channel to which the transceiver is currently tuned. For example, baseband processor 58 and/or other circuitry in control circuitry 42 may analyze received signals to produce various measurements, such as bit error rate measurements, measurements on the amount of power associated with incoming wireless signals, strength indicator (RSSI) information, received signal code power (RSCP) information, reference symbol received power (RSRP) information, signal-to-interference ratio (SINR) information, signal-to-noise ratio (SNR) information, channel quality measurements based on signal quality data such as Ec/Io or Ec/No data, etc.

Radio-frequency front end 62 may include switching circuitry. The switching circuitry may be configured by control signals received from control circuitry 42 (e.g., control signals from storage and processing circuitry 28 via path 50 and/or control signals from baseband processor 58 via path 51). The switching circuitry may include a switch (switch circuit) that is used to connect TX and RX chain(s) to antennas 40A and 40B. Radio-frequency transceiver circuitry 60 may be configured by control signals received from storage and processing circuitry over path 52 and/or control signals received from baseband processor 58 over path 46.

The number of antennas that are used may depend on the operating mode for UE 106. For example, as shown in FIG. 5A, in normal LTE operations, antennas 40A and 40B may be used with respective receivers 61 and 63 to implement a receive diversity scheme, such as for MIMO operations. With this type of arrangement, two LTE data streams may be simultaneously received and processed using baseband processor 58. When it is desired to monitor a GSM paging channel for incoming GSM pages, one or both of the antennas may be temporarily used in receiving GSM paging channel signals.

Control circuitry 42 may be used to execute software for handling more than one radio access technology. For example, baseband processor 58 may include memory and control circuitry for implementing multiple protocol stacks such as a GSM protocol stack 72 and an LTE protocol stack 74. Thus, protocol stack 72 may be associated with a first radio access technology such as GSM (as an example), and protocol stack 74 may be associated with a second radio access technology such as LTE (as an example). During operation, UE 106 may use GSM protocol stack 72 to handle GSM functions and may use LTE protocol stack 74 to handle LTE functions. Additional protocol stacks, additional transceivers, additional antennas 40, and other additional hardware and/or software may be used in UE 106 if desired. The arrangement of FIGS. 5A and 5B is merely illustrative. In one embodiment, one or both of the protocol stacks may be configured to implement the methods described in the flowcharts below.

Improved Data Roaming

As discussed above, a UE may comprise at least one radio, one or more processors, a first SIM entity and a second SIM entity. The at least one radio is configured to perform communication using one or more radio access technology (RATs), such as a first RAT and a second RAT. The one or more processors and the radio may be configured to perform voice and/or data communications.

The first SIM entity may be configured to implement subscriber identity module (SIM) functionality for a subscribed voice and/or data plan of a first carrier. In other words, the first SIM entity may be configured according to a first carrier to which the user has subscribed. For example, the first SIM entity may specify a voice telephone number for the UE that operates with the first carrier.

The second SIM entity may be used to facilitate dynamic subscription to a local data plan of a second carrier when the UE is data roaming outside of a network of the first carrier. As one example, the UE, using the second SIM entity, may be configured to dynamically subscribe to a pay-as-you-go data plan of a second carrier, to which the user is not subscribed, when the user is data roaming outside of the first carrier's network. In other words, the UE, without the use of a third-party intermediary (e.g., an online clearing house, a negotiation service provider, a negotiation server, etc.), may subscribe to a data plan of the second carrier, wherein the UE has no previous ongoing relationship (e.g., a present subscription) with the second carrier. The UE may dynamically subscribe to a local data plan (e.g., a pay-as-you-go data plan) with the second carrier even if the UE has not previously subscribed to any plan with the second carrier before the dynamic subscription. This dynamic subscribing may operate to reduce cost to the user, since the local data plan of the second carrier likely has less expensive data rates than those available during data roaming. The second SIM entity may be configured to facilitate dynamic subscription to a local data plan of any one of a plurality of possible second carriers. The UE may dynamically subscribe to a local data plan of the second carrier via the at least one radio, which is configured to perform communication using one or more RATs.

While the UE is dynamically subscribed to the local data plan of the second carrier using the second SIM entity, the voice telephone number for the UE specified by the first SIM entity may remain operational via use of the first SIM entity.

In one embodiment, the first SIM entity may be a physical SIM card that is configured to provide cellular data service with a first carrier. The second SIM entity may be an electronic SIM (eSIM) that is configured to provide cellular data service with a second carrier. As noted above, the eSIM may comprise a memory comprised on the UE which stores software which implements the eSIM functionality. The first and second SIM entities may have other configurations, as desired. Cellular data service based on the second SIM entity (eSIM) can thus co-exist with cellular data service based on the first SIM entity (the physical SIM). In one embodiment, a data connection can only be established on one data service at any one time.

The UE may further comprise a memory which stores a first protocol stack and a second protocol stack. Thus the UE may store and execute two independent protocol stacks. The first protocol stack may support communication using at least one first RAT of a first carrier using the first SIM entity, and the second protocol stack may support communication using at least one second RAT of a second carrier using the second SIM entity. The processor may be configured to execute either the first protocol stack or the second protocol stack to control the at least one radio. In one embodiment, the second protocol stack, operating based on second SIM entity (the eSIM) may support data communications with one or more of GSM, GPRS/EDGE, UMTS/TDS data, EVO data or LTE data. UMTS/TDS refers to UMTS-FDD data over, for example, a wideband CDMA (WCDMA) air interface and/or UMTS-TDD data over, for example, a time division synchronous code division multiplex access (TD-SCDMA) air interface. The first protocol stack, operating based on the first SIM entity (the physical SIM card) may support both voice and data communications with one or more of GSM, UMTS/TDS, 1x/DO and LTE.

In one embodiment, when the processor is executing the first protocol stack for data communication using a first RAT, the UE is configured to keep the second protocol stack in an idle mode with no data connection. If a data connection is established by the second protocol stack, the UE is configured to switch the first protocol stack to a voice only mode. In the voice only mode, the first protocol stack may be idle or may be in a voice call.

In one embodiment, the UE is configured to automatically select either the first SIM entity or second SIM entity based on service availability of the network, i.e., based on service availability of the network using the first SIM entity vs. service availability of the network using the second SIM entity. The service availability may be determined by a measure of service provided on a camped cell relative to a measure of service provided by a cellular radio condition such as RSSI, RSCP, Ec/No, etc.

In another embodiment, the UE may be configured to receive user input selecting a preference for data communication using either the first SIM entity or the second SIM entity. In other words, the user can choose a preference of receiving data using either the first SIM entity (physical SIM) or the second SIM entity (eSIM). This user input may be provided via a touch screen of the UE, or other user input mechanism.

Thus the UE may be configured to transmit data using either the first or second SIM entity, where this configuration may be specified manually by the user or automatically by an intelligent algorithm based on one or more criteria. These one or more criteria may include cost (roaming vs. non-roaming), RAT, and/or radio link quality metrics, among others.

In one embodiment, circuit-switched and packet-switched services may be split between the two SIM entities. For example, the UE may be configured to perform circuit-switched voice communication on the first SIM entity using one of GSM, UMTS/TDS, CDMA or VoLTE, among others. The UE may be configured to perform packet-switched communication on the second SIM entity.

In one embodiment, the UE is configured to perform voice communication using the first SIM entity concurrently with data communication using the second SIM entity. In other words, the UE may simultaneously support voice on the physical SIM card and data on the eSIM. During data communication using the second SIM entity (eSIM), the UE is configured to monitor for voice pages on a network supported by the first SIM entity. If a voice call is originated (mobile originating or mobile terminating) during data transfer using the second SIM entity, the data transfer may be suspended during the voice call and may be resumed after the voice call is completed.

While a voice call is initiated on the first SIM entity (physical SIM), data can be simultaneously transferred using the second SIM entity (eSIM). This may be performed using RATs such as GSM voice—LTE data, GSM voice—UMTS/TDS data, TDS voice—LTE data, UMTS voice—LTE data, 1× voice—GSM data/UMTS/TDS data/LTE data.

If the first SIM entity (physical SIM) is camped on GSM for voice, the second SIM entity (eSIM) may utilize one of GSM, UMTS/TDS, EVDO or LTE. This is effectively a special DSDS (Dual SIM Dual Standby) for the case of GSM, where GSM voice can be performed using the first SIM entity (physical SIM), and on the second SIM entity (eSIM) one or more of GSM GPRS/EDGE data, UMTS/TDS/DCH data, and LTE data may be used.

If the first SIM entity (physical SIM) is camped on UMTS/TDS for voice, the second SIM entity (eSIM) can be on GSM, UMTS/TDS, or LTE. In the following two special cases: UMTS-UMTS and TDS-TDS, the protocol stack over the first and second SIM entities, (over physical SIM and eSIM) may be the same instances.

For these two special cases, there are 2 options: 1) the two UMTS/TDS protocol stack instances share one UMTS/TDS physical layer and modem HW; and 2) the 2 UMTS/TDS protocol stack instances each has its own physical layer and modem HW.

If the first SIM entity (physical SIM) is camped on LTE for voice over LTE, the second SIM entity (eSIM) can be on GSM, UMTS/TDS, EVDO, or LTE for data. GSM data+VoLTE is conceptually the same as GSM voice+LTE, where the difference is LTE voice subframes are higher priority than GSM TBF blocks.

UMTS/TDS/EVDO/LTE data+VoLTE can be implemented using 2 RX and 1 common TX, where UMTS/TDS/EVDO/LTE data and VoLTE each has its own RX, but share the same TX. This is possible because voice over LTE is effectively 2 ms subframes carrying voice frames in 40 ms CDRX cycle, it can time multiplexed with UMTS/TDS/EVDO/LTE data on same TX RF chain.

If the first SIM entity (physical SIM) is camped on 1× for voice, the second SIM entity (eSIM) can be on GSM, UMTS/TDS, EVDO, and LTE for data.

FIG. 6—Flowchart

Figure 6:
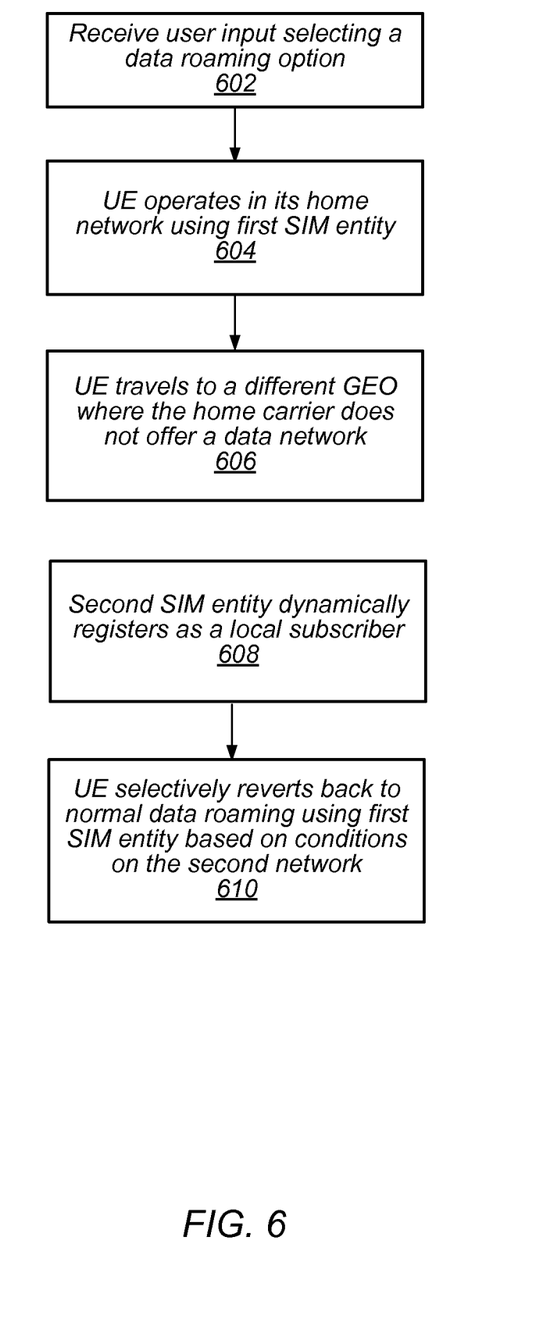
FIG. 6 is a flowchart diagram illustrating an exemplary method for performing improved data roaming, according to some embodiments.

FIG. 6 is a flowchart diagram illustrating some embodiments of a method for improved data roaming.

As shown, at 602 the UE may receive user input selecting a preference for data communication using either the first SIM entity or the second SIM entity. In other words, the user can choose a preference of receiving data using either the first SIM entity (physical SIM) or the second SIM entity (eSIM). This user input may be provided via a touch screen of the UE, or other user input mechanism.

Where the user selects an option to receive data only using the first SIM entity, the user is essentially selecting standard roaming operations as would normally be performed. Thus when the user travels to a geographic location where the first carrier to which he (the UE) is subscribed does not offer a data network, and begins performing data communications, the first SIM entity will cause the UE to roam on another carrier's network. This may entail data roaming charges, which can be quite expensive.

Where the user selects an option to enable receipt of data also using the second SIM entity, the user selects improved/ more cost effective roaming operations. Thus when the user later travels to a geographic location where the first carrier to which the user (the UE) is subscribed does not offer a data network, and begins performing data communications, the UE will dynamically subscribe to a local data plan of a second carrier using the second SIM entity. The UE may dynamically subscribe to the local data plan of the second carrier without the use of a third party intermediary. That is, the UE may not need to be routed through an online clearing house or a negotiation server in order to dynamically subscribe to a data plan of the second carrier. This may provide a more cost effective option for data communication when the UE is operating out of its normal network.

At 604 the user (and the user's UE) is operating in his "home network," i.e., the network of the first carrier to which he has subscribed. When the UE is operating on its home network, the first SIM entity is used for both voice and data communications, and the second SIM entity is not used. Here the UE presumably has the lowest fees/rates on its home network, and thus there is no need for a second different carrier.

Alternatively, when the UE is operating in its home network, the second SIM entity may be used for the data network of the first carrier. As yet another alternative, even when the UE is operating on its home network, the second SIM entity may possibly be used to register as a local user of a second different network, e.g., when the data service of the home network is not working properly or is inadequate.

At 606 the user (and the user's UE) travels to a different geographic location where the first carrier does not offer a data network.

In this instance, when the user desires to perform data communication, such as email, Internet, etc., and the UE has been configured according to the second option in 602 above, at 608 the UE may dynamically operate to register as a local subscriber on a local data plan of a second network (second carrier) using the second SIM entity, wherein the second carrier is different from the first carrier. The user does not need to physically insert the second SIM entity in order to register as a local subscriber on a local data plan. The local data plan of the second carrier may have less expensive data rates than those that would be available during conventional data roaming. Thus the user can gain the reduced rates of a local data plan even when the UE is operating outside of its home network. The voice telephone number for the UE specified by the first SIM entity may remain operational while the second SIM entity is subscribed to the local data plan of the second carrier. Thus the voice operation of the UE operates as normal, and the UE is able to place and receive calls on its home (first) network using the first SIM entity.

In one embodiment, the UE, using the second SIM entity, operates to automatically register as a local subscriber with the second network, without any input required from the user and without going through a third party intermediary. Alternatively, when the user provides input to initiate data communications, the UE may present the user with an option of whether to enable registering as a local subscriber on another network using the second SIM entity. In determining whether to automatically register as a local subscriber (or to present the user with an option to do so), the UE in one embodiment may consider various criteria, such as: 1) radio link quality metrics as mentioned above; 2) the relative costs of data roaming (using the first SIM entity) and non-roaming (using the second SIM entity); and 3) the RAT used in each of the roaming and non-roaming cases At 610 after the UE has performed data communications on the second network for a period of time, the UE may experience performance degradation on the second network. When the UE experiences this performance degradation on the second network, in one embodiment at 610 the UE reverts back to conventional data roaming using the first SIM entity. The UE continues to monitor the second network, and when conditions on the second network have improved, the UE may resume use of the second SIM entity and the second network to achieve cost savings.

In determining whether to begin, discontinue, and/or resume use of the second SIM entity and the second network as discussed above in 608 and 610, the UE may utilize various criteria as noted above. In one embodiment, in determining whether to discontinue using the second SIM entity and the second network and to start using the first SIM entity and normal data roaming, the UE may compare one or more metrics of the second network to a threshold to determine the degree to which network channel conditions on the second network have deteriorated. In determining whether to resume using the second SIM entity and the second network, the UE may compare one or more metrics of the second network to a threshold to determine if network channel conditions on the second network have sufficiently improved.

In one embodiment, in determining whether to initiate, suspend, and/or resume use of the second SIM entity, the UE may consider one or more of: 1) radio link quality metrics; 2) the relative costs of data roaming (using the first SIM entity) and non-roaming (using the second SIM entity); and 3) the RAT used in each of the roaming and non-roaming cases, as well as other possible criteria. Thus the UE may be configured to transmit data using either the first or second SIM entity, where this configuration may be specified manually by the user or automatically by an intelligent algorithm based on one or more criteria. These one or more criteria may include cost (roaming vs. non-roaming), RAT, and/or radio link quality metrics, among others.

Thus the UE performs the majority, and preferably all, of the data communication as a local subscriber to the second network. The UE may selectively, and temporarily, revert back to normal (and more expensive) data roaming when channel conditions on the second network deteriorate. The UE may further resume use of the second SIM entity (non-roaming) when conditions warrant.

For example, assume as an example that the UE is registered with a US carrier such as AT&T. When the UE is located in the United States it will typically be operating on its home network (AT&T) using the first SIM entity, as described above at 604. Where AT&T does not offer a data network, data roaming may be possible on another carrier at a similarly low cost.

Now assume that the user (and his UE) travels to the U.K. where the user's home network is not available. Here the UE may recognize that the home network (first carrier) is not available for data service, and hence data roaming is required. After recognizing this, the UE may dynamically register, using the second SIM entity, as a local subscriber with a local carrier in the UK who operates a second network, so that the user can take advantage of the lower data rates for a local subscriber relative to normal data roaming. The UE may then receive data services on the second network of the second carrier, wherein the user of the UE is charged as a local subscriber to the second carrier. This results in reduced costs to the user relative to data roaming.

Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A user equipment device (UE), comprising:
at least one antenna;
at least one radio, wherein the at least one radio is configured to perform communication using at least one radio access technology (RAT);
one or more processors coupled to the at least one radio, wherein the one or more processors and the at least one radio are configured to perform voice and data communications;
a first subscriber identity module (SIM) entity, wherein the first SIM entity is configured to implement SIM functionality for a subscribed voice and data plan of a first cellular carrier; and
a second SIM entity, wherein the UE is configured to dynamically subscribe, using a cellular network of a second cellular carrier, to a local data plan of the second cellular carrier using the second SIM entity when the UE is data roaming outside of a network of the first cellular carrier,
wherein to dynamically subscribe to the local data plan of the second cellular carrier, the UE is further configured to automatically register as a local subscriber with the second cellular carrier, wherein the second SIM entity has no prior ongoing association with the second cellular carrier;
wherein when the second SIM entity establishes a data connection while the UE is data roaming outside of a network of the first cellular carrier, the first SIM entity is configured to operate in a voice only mode and the second SIM entity is configured to perform data communication.

2. The UE of claim 1,
wherein the UE is configured to perform data communications with the second cellular carrier as a local subscriber with the second cellular carrier after being dynamically subscribed to the local data plan of the second cellular carrier;
wherein the local data plan of the second cellular carrier has less expensive data rates than those available during data roaming outside of the network of the first cellular carrier.

3. The UE of claim 1,
wherein the first SIM entity specifies a voice telephone number for the UE;
wherein the voice telephone number for the UE specified by the first SIM entity remains operational while the second SIM entity is dynamically subscribed to the local data plan of the second cellular carrier.

4. The UE of claim 1,
wherein the UE is configured to dynamically subscribe to a local data plan of any one of a plurality of second cellular carriers using the second SIM entity.

5. The UE of claim 1, further comprising:
a memory which stores a first protocol stack that that supports communication using at least one first RAT using a first cellular carrier indicated by the first SIM entity;
wherein the memory stores a second protocol stack that supports communication using at least one second RAT using a second cellular carrier indicated by the second SIM entity;
wherein the processor is configured to execute either the first protocol stack or the second protocol stack.

6. The UE of claim 5,
wherein when the processor is executing the first protocol stack for data communication using the at least one first RAT, the UE is configured to keep the second protocol stack in an idle mode with no data connection;
wherein if a data connection is established by the second protocol stack, the UE is configured to switch the first protocol stack to a voice only mode.

7. The UE of claim 1,
wherein the UE is configured to receive user input selecting a preference for data communication using either the first SIM entity or the second SIM entity.

8. The UE of claim 1,
wherein the UE is configured to automatically select either the first SIM entity or second SIM entity for data service based at least on service availability;
wherein service availability is determined by a measure of service provided.

9. The UE of claim 1,
wherein after dynamically subscribing to the local data plan of the second cellular carrier, the UE is configured to automatically discontinue using the second SIM entity and begin using the first SIM entity in response to determining that data service of the second cellular carrier is less than a desired threshold;
wherein the UE is configured to resume using the local data plan of the second cellular carrier in response to determining that the data service of the second cellular carrier has become greater than a desired threshold.

10. The UE of claim 1, wherein the UE is configured to perform circuit-switched voice communication on the first SIM entity using one of GSM, UMTS, TDS, CDMA, or VoLTE.

11. The UE of claim 1,
wherein the UE is configured to perform voice communication using the first SIM entity concurrently with data communication using the second SIM entity;
wherein during data communication using the second SIM entity, the UE is configured to monitor for voice pages on a network supported by the first SIM entity.

12. The UE of claim 1,
wherein the second SIM entity is further configured to perform data communications with the second cellular carrier as a local subscriber with the second cellular carrier after said dynamically registering; and
wherein, to automatically register as a local subscriber with the second cellular carrier, the UE is configured to take into account at least one of the following criteria:
radio link quality metrics;
a cost of data roaming using the first SIM entity as compared to a cost of non-roaming using the second SIM entity; and
a RAT used in each of the roaming and non-roaming cases.

13. A method, comprising:
at a user equipment device (UE):
determining that the UE is data roaming outside of a network of a first cellular carrier, wherein a first subscriber identity module (SIM) entity of the UE is configured to implement SIM functionality for a subscribed voice and data plan of the first cellular carrier; and
dynamically subscribing, over a cellular network of a second cellular carrier, to a local data plan of the second cellular carrier in response to determining that the UE is data roaming outside of a network of the first cellular carrier,
wherein said dynamically subscribing is performed using a second SIM entity of the UE, wherein dynamically subscribing to the local data plan of the second cellular carrier includes automatically registering as a local subscriber with the second cellular carrier,
wherein the second SIM entity has no prior ongoing association with the second cellular carrier; wherein when the second SIM entity establishes a data connection while the UE is data roaming outside of a network of the first cellular carrier the first SIM entity is configured to operate in a voice only mode and the second SIM entity is configured to perform data communication.

14. The method of claim 13,
wherein the local data plan of the second cellular carrier has less expensive data rates than those available during data roaming.

15. The method of claim 13, further comprising:
receiving, by the UE, user input selecting a preference for data communication using either the first SIM entity or the second SIM entity.

16. The method of claim 13, further comprising:
performing by the UE,
measuring a quality of service provided by at least one of a data roaming network or a network of the second cellular carrier;
automatically selecting either the first SIM entity or the second SIM entity for data service based at least on the measuring.

17. The method of claim 13, further comprising:
performing by the UE,
determining that data service of the second cellular carrier is less than a first threshold;
after dynamically subscribing to the local data plan of the second cellular carrier, automatically discontinuing using the second SIM entity and beginning use of the first SIM entity in response to said determining that data service of the second cellular carrier is less than the first threshold.

18. The method of claim 17, further comprising:
performing by the UE,
determining that the data service of the second cellular carrier has become greater than a second threshold; and
resuming using the local data plan of the second cellular carrier in response to determining that the data service of the second cellular carrier has become greater than the second threshold.

19. A non-transitory, computer accessible memory medium storing program instructions for performing handover by a user equipment device (UE), wherein the program instructions are executable by a processor to:
determine that the UE is data roaming outside of a network of a first cellular carrier, wherein a first subscriber identity module (SIM) entity of the UE is configured to implement SIM functionality for a subscribed voice and data plan of the first cellular carrier; and
dynamically subscribe, using a cellular network of a second cellular carrier, to a local data plan of the second cellular carrier in response to determining that the UE is data roaming outside of a network of the first cellular carrier wherein said dynamically subscribing is performed using a second SIM entity of the UE,
wherein dynamically subscribing to the local data plan of the second cellular carrier includes automatically registering as a local subscriber with the second cellular carrier, wherein the second SIM entity has no prior ongoing association with the second cellular carrier,
wherein when the second SIM entity establishes a data connection while the UE is data roaming outside of a network of the first cellular carrier the first SIM entity is configured to operate in a voice only mode and the second SIM entity is configured to perform data communication.

* * * * *